US008570624B2

(12) United States Patent
Nagashima

(10) Patent No.: US 8,570,624 B2
(45) Date of Patent: Oct. 29, 2013

(54) IMAGE FORMING APPARATUS

(75) Inventor: Teruhiko Nagashima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 295 days.

(21) Appl. No.: 13/074,192

(22) Filed: Mar. 29, 2011

(65) Prior Publication Data

US 2011/0242626 A1    Oct. 6, 2011

(30) Foreign Application Priority Data

Mar. 31, 2010 (JP) ................................. 2010-080720

(51) Int. Cl.
| H04N 1/04 | (2006.01) |
| G06F 3/12 | (2006.01) |
| G03G 15/00 | (2006.01) |
| B41J 15/00 | (2006.01) |

(52) U.S. Cl.
USPC ........... 358/498; 358/1.13; 358/1.1; 358/497; 358/474; 399/110; 399/397; 400/613

(58) Field of Classification Search
USPC .................. 358/498, 1.13, 1.1, 497; 400/613; 399/397
See application file for complete search history.

(56) References Cited

U.S. PATENT DOCUMENTS

| 6,462,839 B1 * | 10/2002 | Short .............................. 358/474 |
| 8,103,186 B2 * | 1/2012 | Andoh et al. .................. 399/110 |
| 2006/0165467 A1 * | 7/2006 | Kawakami et al. ............ 400/613 |
| 2008/0205953 A1 * | 8/2008 | Takemoto et al. ............. 399/397 |
| 2008/0310898 A1 | 12/2008 | Jo et al. |
| 2009/0122330 A1 | 5/2009 | Andoh et al. |
| 2010/0097667 A1 * | 4/2010 | Ikeda et al. .................... 358/497 |
| 2011/0075178 A1 * | 3/2011 | Nishikawa .................... 358/1.13 |
| 2011/0075230 A1 * | 3/2011 | Kawai ............................ 358/498 |

FOREIGN PATENT DOCUMENTS

| CN | 101324770 A | 12/2008 |
| JP | 2008-209626 | 9/2008 |
| JP | 2009-086628 | 4/2009 |

OTHER PUBLICATIONS

Office Action mailed Jun. 27, 2013 in Chinese Patent Application No. 201110075973.8.

* cited by examiner

*Primary Examiner* — Charlotte M Baker
*Assistant Examiner* — Rury Grisham
(74) *Attorney, Agent, or Firm* — Dilworth & Barrese, LLP

(57) ABSTRACT

An image forming apparatus includes: an apparatus main body with an opening formed on an upper face thereof; an original document reading device that opens and closes the opening; an original document holder that is supported openably and closably by the original document reading device; a first lock mechanism that locks opening and closing of the original document reading device with respect to the apparatus main body; and a second lock mechanism that locks opening and closing of the original document holder with respect to the original document reading device, in which the first lock mechanism and the second lock mechanism are disposed inside a cabinet of the original document reading device.

4 Claims, 15 Drawing Sheets

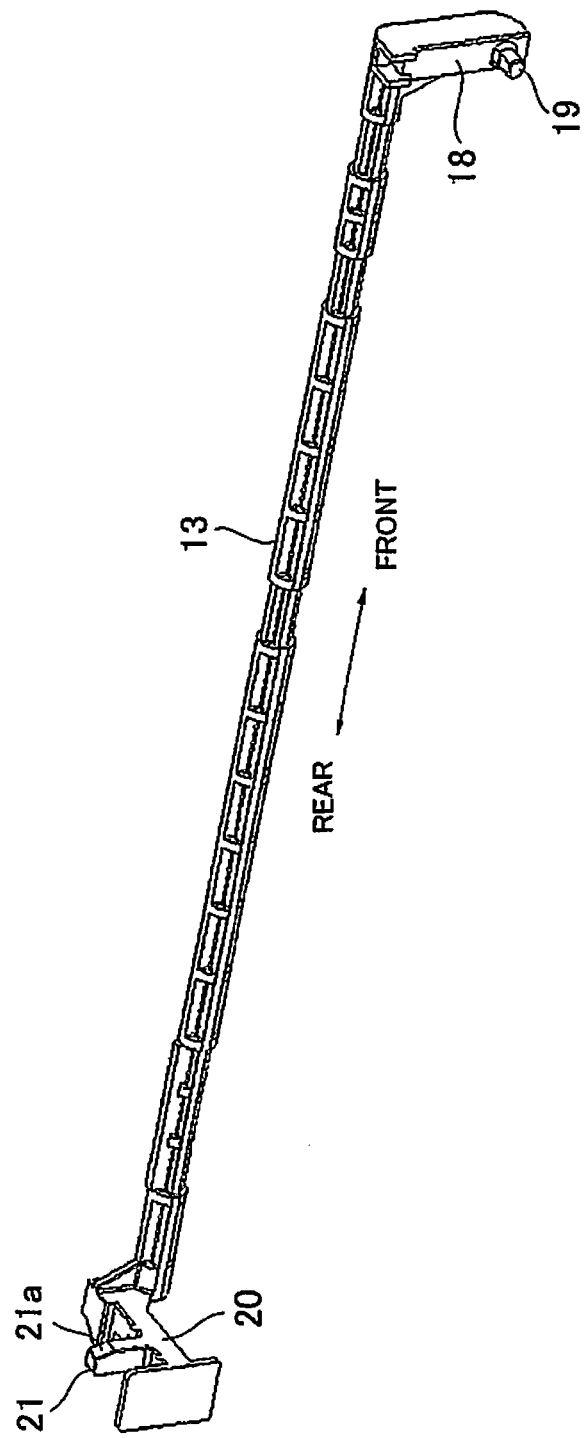

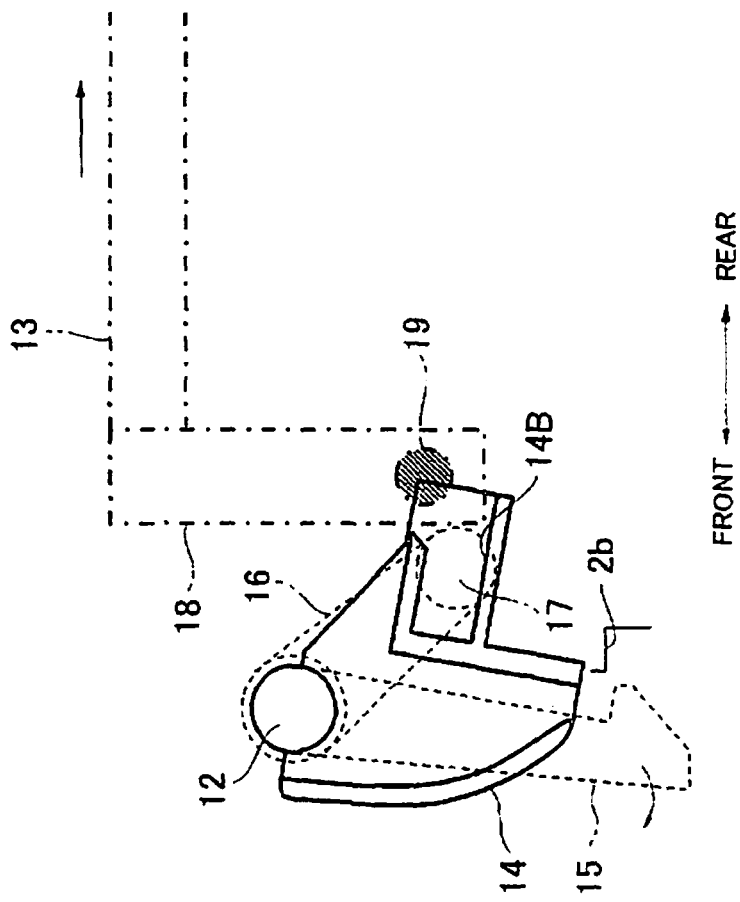
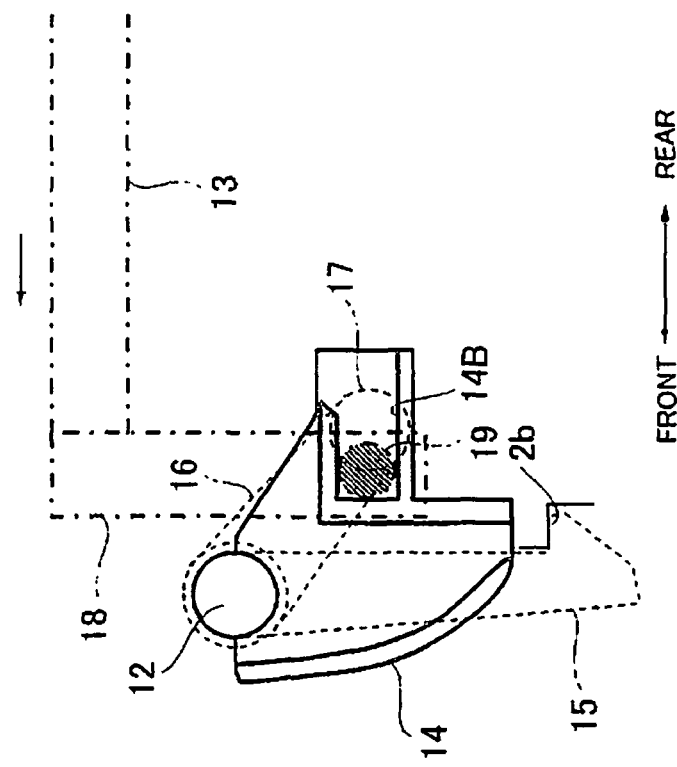

FIG. 13A
FIG. 13B
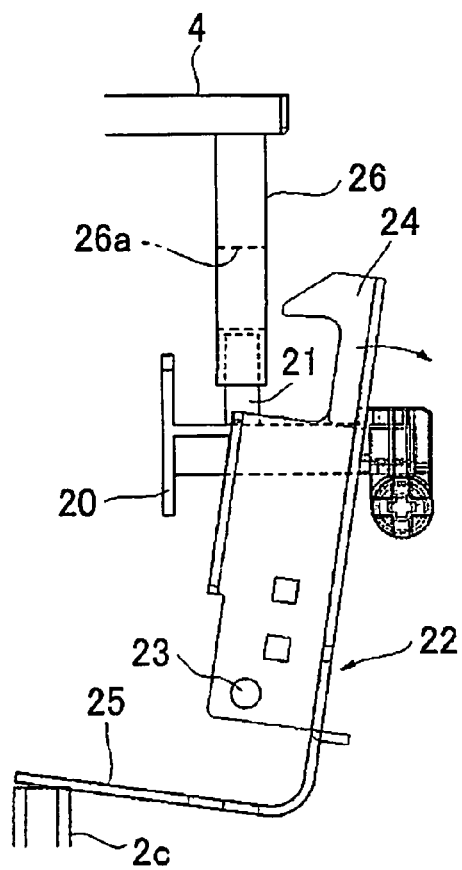
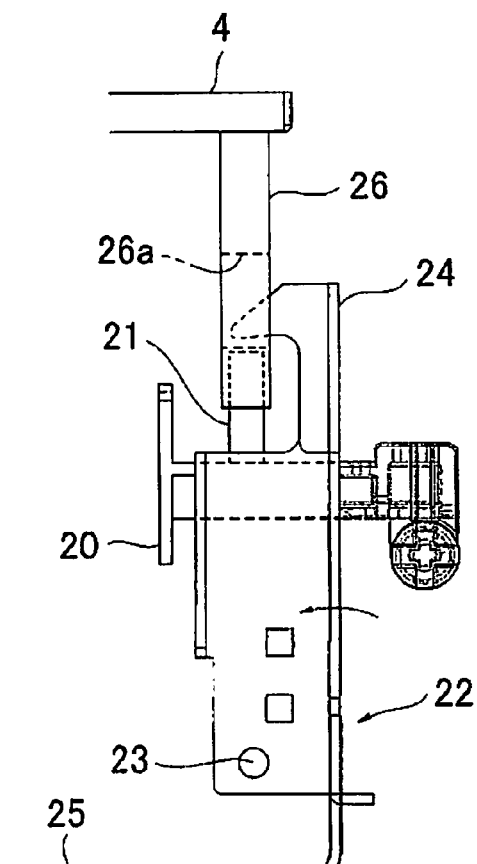
LEFT ←→ RIGHT
LEFT ←→ RIGHT

IMAGE FORMING APPARATUS

This application is based on and claims the benefit of priority from Japanese Patent Application No. 2010-080720, filed on 31 Mar. 2010, the content of which is incorporated herein by reference.

BACKGROUND OF THE INVENTION

1. Field of the Invention

The present invention relates to an image forming apparatus provided with an original document reading device that opens and closes an opening in an upper face of the apparatus main body and an original document holder that is openably and closably supported by the original document reading device.

2. Related Art

An image forming apparatus that forms an image on a sheet of paper by electrography, such as a copy machine, a printer, a multi-function peripheral (MFP) and the like, has been known. One example is that an opening 102a is formed in an upper face of an apparatus main body 102 and opened and closed by an original document reading device 103 for replacement of a drum unit, a toner cartridge and the like (not illustrated), as shown in FIG. 15.

The original document reading device 103 is provided with an original document holder 104 for fixing an original document on a reading surface by pressing the original document from above. The original document holder 104 is supported openable and closable with respect to the original document reading device 103. As a result, when the original document reading device 103 is opened while the original document holder 104 is left open as shown in FIG. 15, during replacement of a drum unit, a toner cartridge and the like, the original document holder 104 projects largely from the apparatus main body 102, so that a center of gravity of an image forming apparatus 101 as a whole will shift. Accordingly, the installation of the image forming apparatus 101 will be unstable. Especially when an automatic document feeder (ADF) is attached to the original document holder 104, the original document holder 104 as a whole increases in weight. In such a case, the installation of the image forming apparatus 101 will be more unstable.

In order to solve the abovementioned problem, a configuration is proposed for an image forming apparatus. The configuration includes a lock mechanism that restricts opening of an upper cover member when a platen cover is opened. The image forming apparatus includes the upper cover member and an original document reading device. The upper cover member covering an upper face of an apparatus main body is openable and closable. The original document reading device is disposed inside a space provided above in the upper cover member. The platen cover of the original document reading device and the upper cover member open in the same direction.

In addition, another configuration is proposed for an image forming apparatus. The other configuration includes a moving mechanism that causes an original document pressing part to move in the same direction as an original document reading part synchronously with an open movement of the original document reading part. This image forming apparatus includes the original document reading part that is openable and closable with respect to an apparatus main body and the original document pressing part openable and closable in the same direction as an opening/closing direction of the original document reading part.

SUMMARY OF THE INVENTION

However, all configurations having a lock mechanism have the lock mechanism disposed outside an apparatus. In such configurations, an overall height of the apparatus increases, leading to a disadvantage associated with a reduction in height and size.

In addition, a configuration having a moving mechanism requires the moving mechanism to be complex, so that a problem arises in that the number of components increases to result in a more complex structure.

The present invention aims at providing an image forming apparatus that renders an installation thereof to be stable and realizes a reduction in height and size with a simple configuration.

In an aspect of the present invention, an image forming apparatus is provided, which includes an apparatus main body, an original document reading device, an original document holder, a first lock mechanism and a second lock mechanism. The apparatus main body includes an opening formed in an upper face thereof. The original document reading device is configured to open and close the opening. The original document holder is configured to be openably and closably supported by the original document reading device. The first lock mechanism is configured to lock opening and closing of the original document reading device with respect to the apparatus main body. The second lock mechanism is configured to lock opening and closing of the original document holder with respect to the original document reading device. The first lock mechanism and the second lock mechanism are disposed inside a cabinet of the original document reading device.

According to the present invention, the first lock mechanism for locking opening and closing of the original document reading device with respect to the apparatus main body and the second lock mechanism for locking opening and closing of the original document holder with respect to the original document reading device are disposed inside the cabinet of the original document reading device. This can reduce the height of the original document reading device, thereby reducing the overall height of the image forming apparatus. Accordingly, a simplified structure and height and size reduction are thus realized. In addition, as it is not necessary for an operator to touch movable parts and the like of the first and second lock mechanisms, a cover for these parts will be unnecessary, so that the number of components will be reduced.

BRIEF DESCRIPTION OF THE DRAWINGS

FIG. 7 is a perspective view of the link rod;

FIG. 10A is a diagram illustrating engagement and disengagement of a hook of the first lock mechanism with respect to an engagement part on the apparatus main body, and rotation locking performed by the link rod of the operation lever;

FIG. 10B is a diagram illustrating engagement and disengagement of the hook of the first lock mechanism with respect to the engagement part on the apparatus main body, and rotation unlocking performed by the link rod of the operation lever;

FIG. 13A is a diagram illustrating unlocking of the hook of the second lock mechanism with respect to the original document holder lock member;

FIG. 13B is a diagram illustrating locking of the hook of the second lock mechanism with respect to the original document holder lock member;

DETAILED DESCRIPTION OF THE INVENTION

Embodiments of the present invention will be described hereinafter with reference to the attached drawings.

Figure 1:
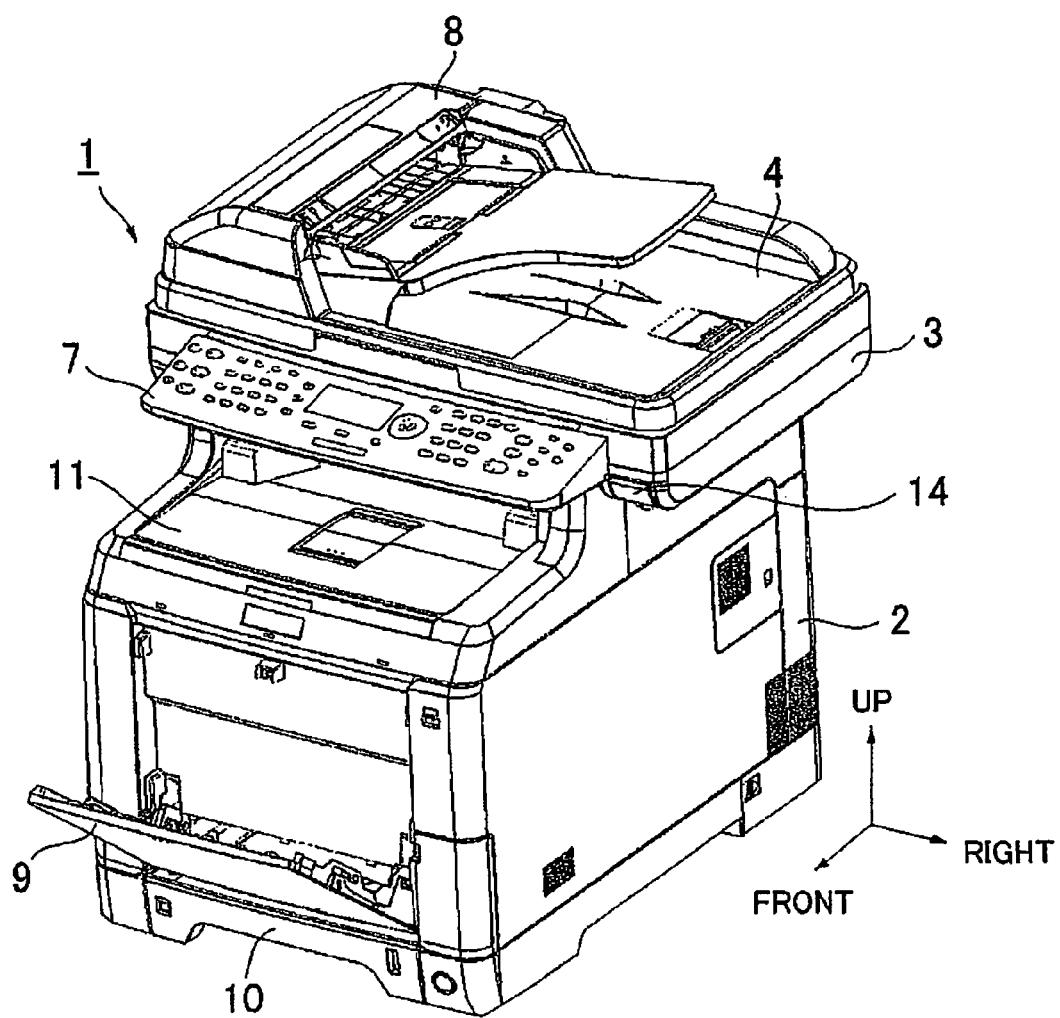
FIG. 1 is a perspective view of an image forming apparatus according to the present invention.
Figure 2:
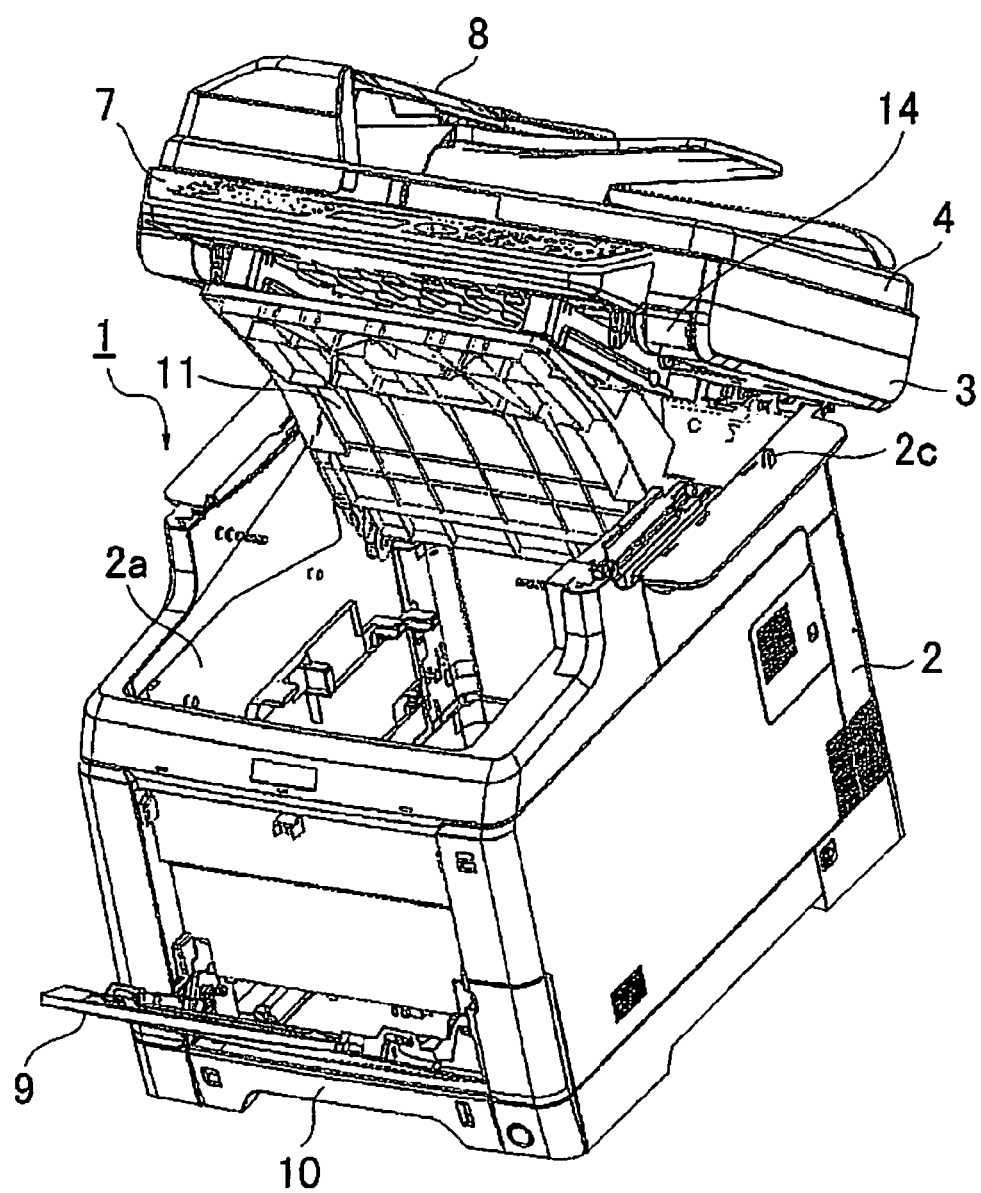
FIG. 2 is a perspective view showing the image forming apparatus according to the present invention in a state in which an original document reading device is open.
Figure 3:
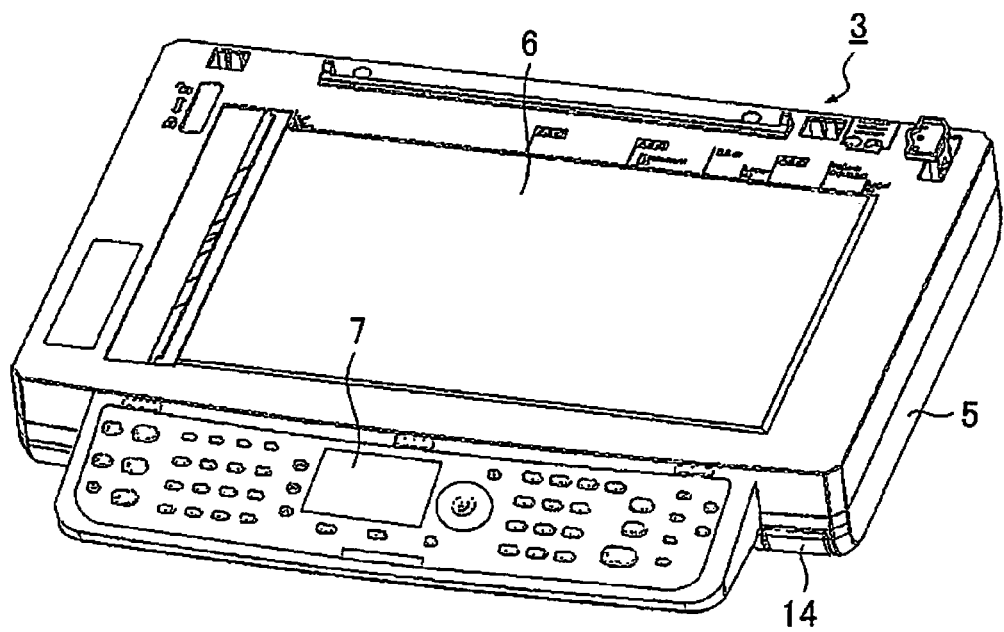
FIG. 3 is a perspective view of the original document reading device.

As shown in FIGS. 1 and 2, an image forming apparatus 1 is a multi-function peripheral (MFP) having a copy function, a printer function, and a facsimile function. An original document reading device 3 for optically reading an original document is provided above an apparatus main body 2 of the image forming apparatus 1, so as to be openable and closable with respect to the apparatus main body 2. An original document holder 4 is provided openable and closable in the original document reading device 3. As shown in FIG. 3, a rectangular box-shaped cabinet 5 of the original document reading device 3 has a transparent platen glass 6 being fixed to an upper face thereof and an operation part 7 being disposed in front thereof. The original document holder 4 holds an original document placed on the platen glass 6 of the original document reading device 3. An automatic document feeder (ADF) 8 for sequentially feeding a plurality of sheets of original document to the platen glass 6 is attached to the original document holder 4.

In addition, the apparatus main body 2 includes various processing devices such as a photoreceptor drum, a charging device, an exposure device, a developing device, a transfer device, and a fixing device, as well as a toner cartridge for supplying toner to the developing device. In addition, a manual feeding tray 9 is provided openable and closable in a front face of the apparatus main body 2. Furthermore, a paper feeding cassette 10 is provided drawable forward at a bottom portion of the apparatus main body 2, below the manual feeding tray 9.

Incidentally, in the image forming apparatus 1, the photoreceptor drum and the charging device are configured as a drum unit being attachable and detachable with respect to the apparatus main body 2 similar to the toner cartridge. In addition, an opening 2a, through which the drum unit and the toner cartridge are loaded and unloaded, is formed in an upper portion of the apparatus main body 2 as shown in FIG. 2. As shown in FIG. 1, when the original document reading device 3 is closed, the opening 2a is closed with an upper cover 11 having also a function of a paper discharging tray.

The original document reading device 3 is opened and closed rotationally about a rotational axis on a rear side of an upper portion of the apparatus main body 2, and the original document holder 4 is opened and closed rotationally about a rotational axis on a rear side of an upper portion of the original document reading device 3. As shown in FIG. 2, the upper cover 11 is configured to rotate, accompanying a movement of the original document reading device 3 and the original document holder 4 which are opened in unison. As a result, the opening 2a in the upper face of the apparatus main body 2 is exposed. The upper cover 11 is also configured to rotate accompanying a movement of the original document reading device 3 and the original document holder 4 which are closed as shown in FIG. 1. Accordingly the opening 2a in the upper face of the apparatus main body 2 is closed.

Figure 4:
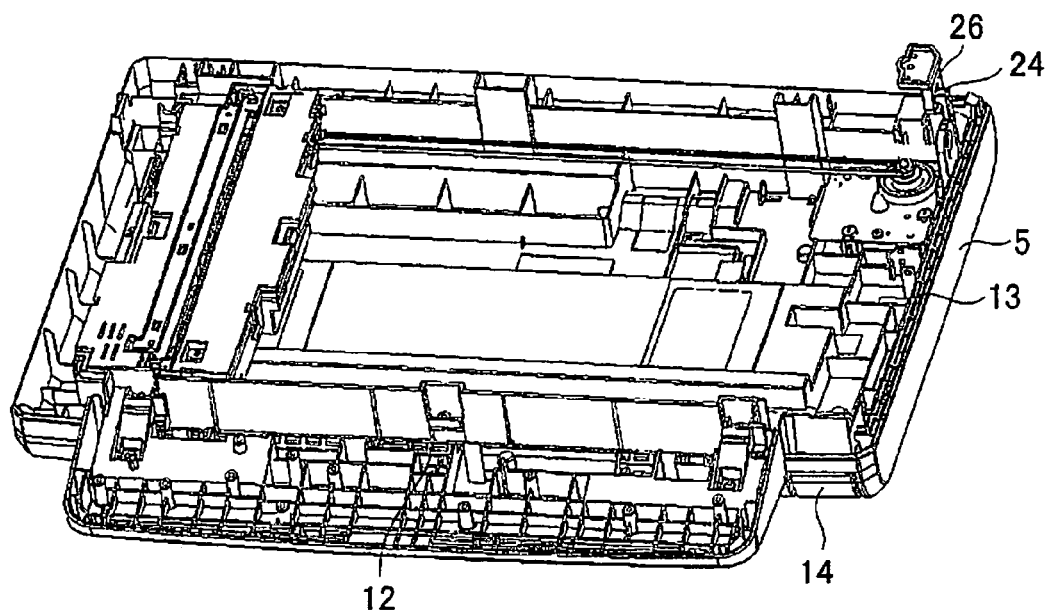
FIG. 4 is a perspective view showing an internal structure of the original document reading device.

In addition, in the image forming apparatus 1 according to the present embodiment, a first lock mechanism and a second lock mechanism are provided. The first lock mechanism locks opening and closing of the original document reading device 3 with respect to the apparatus main body 2. The second lock mechanism locks opening and closing of the original document holder 4 with respect to the original document reading device 3. The first lock mechanism and the second lock mechanism are installed in the cabinet 5 of the original document reading device 3 shown in FIGS. 3 and 4.

First, a configuration of the first lock mechanism will be hereinafter described.

Figure 5:
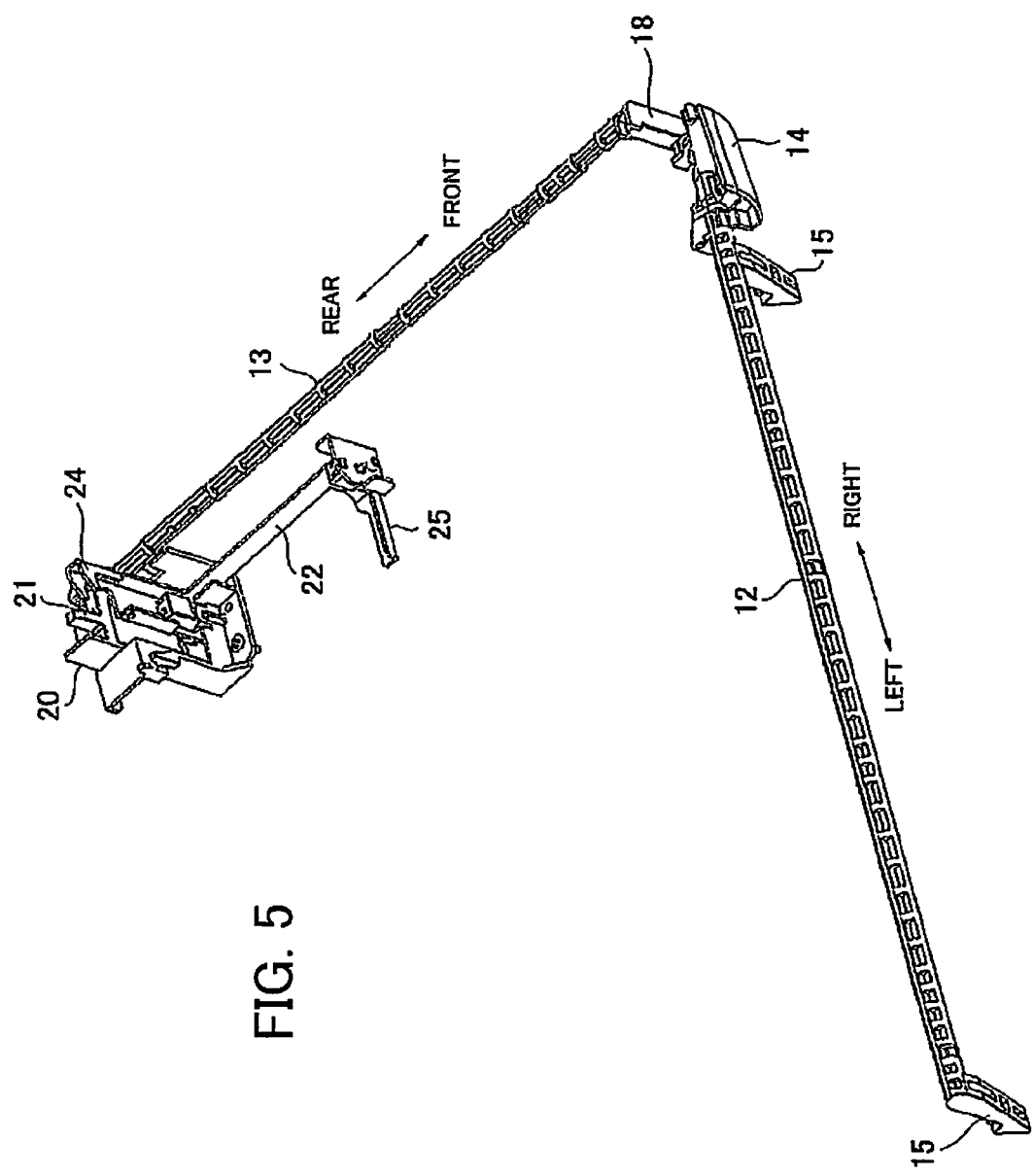
FIG. 5 is a perspective view of a lever shaft and a link rod composing a first lock mechanism and a second lock mechanism.
Figure 6:
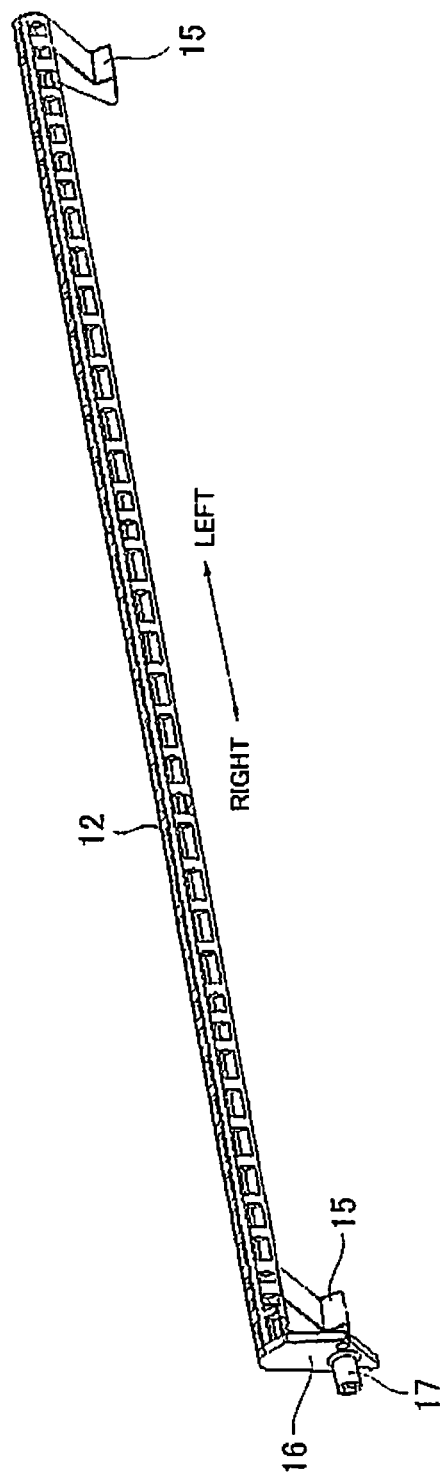
FIG. 6 is a perspective view of the lever shaft of the first lock mechanism.
Figure 9:
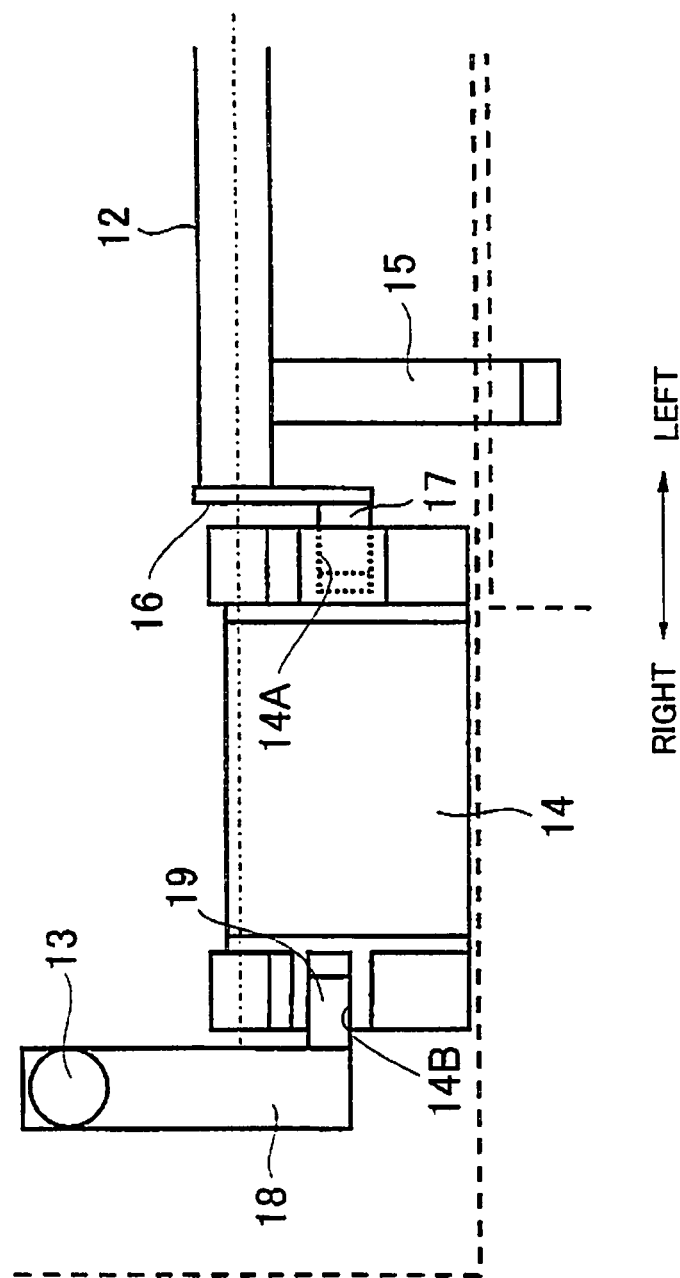
FIG. 9 is a diagram showing a connection structure of the lever shaft and the link rod with respect to the operation lever.

As shown in FIG. 5, the first lock mechanism includes a lever shaft 12 and a link rod 13 that are disposed orthogonal to each other. The lever shaft 12 is disposed along a front inner face of the cabinet 5 of the original document reading device 3. The link rod 13 is disposed along a right inner face of the cabinet 5 (see FIG. 4). As shown in FIG. 9, an operation lever 14 is connected to a right end portion of the lever shaft 12 via an arm 16 and a pin 17. In addition, hooks 15 extending in a direction orthogonal to an axial direction of the lever shaft 12 are provided at the right end portion on an inner side of the operation lever 14 and at a left end portion of the lever shaft 12, respectively. As shown in FIG. 9, the arm 16 is provided orthogonal to the axial direction of the lever shaft 12 at the right end of the lever shaft 12. The pin 17 is provided to project parallel to the lever shaft 12 on an end portion of the arm 16.

As shown in FIG. 7, the arm 18 is provided orthogonal to an axial direction of the link rod 13 at a front end, which is a first end side of the link rod 13. At a lower end portion of the arm 18, a pin 19 is provided to project orthogonally toward a left side of FIG. 9. A horizontal cam member 20 is provided orthogonal to an axial direction of the link rod 13 at a rear end that is a second end side of the link rod 13. The cam member 20 is formed integrally with the link rod 13. In addition, the cam member 20 is integrally provided with a cam 21 in a vertical rib shape. An inclined cam surface 21a is formed at a tip of the cam 21.

Figure 8A:
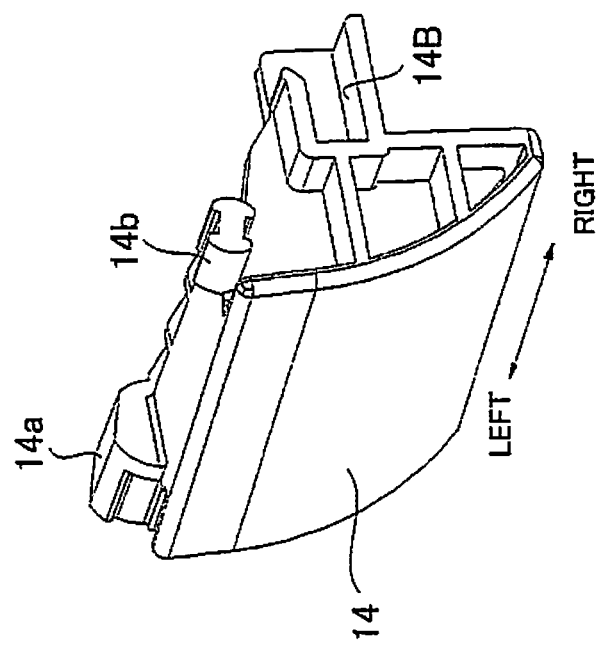
FIG. 8A is a perspective view of an operation lever.
Figure 8B:
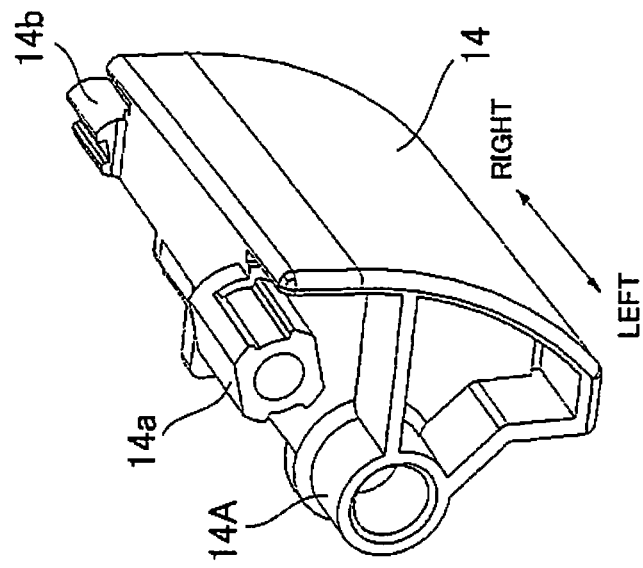
FIG. 8B is a perspective view of the operation lever.

As shown in FIGS. 8A and 8B, shafts 14a and 14b are integrally formed on left and right sides of an upper end portion of the operation lever 14. The operation lever 14 is disposed, as shown in FIGS. 1 to 4, in a concave portion formed next to the operation part 7 at a front right end portion of the original document reading device 3. The operation lever 14 is supported swingably by the cabinet 5 through the shafts 14a and 14b formed on the left and right sides of the upper end portion thereof. As shown in FIG. 9, a rotational center of the swing motion coincides with the axial center of the lever shaft 12.

In addition, as shown in FIG. 8A, a cylindrical boss 14A is integrally formed on a left end face of the operation lever 14. As shown in FIG. 9, the pin 17 provided to the arm 16 at the right end of the lever shaft 12 is fitted into the boss 14A. Accordingly, when the operation lever 14 is rotationally operated about the shafts 14a and 14b, the arm 16 provided with the pin 17 fitted into the boss 14A rotates. In addition, the lever shaft 12 and the pair of left and right hooks 15 provided on the lever shaft 12 are integrally rotated. As shown in FIGS. 10A and 10B, the hooks engage with or disengage from engagement parts 2b each shaped like a dented step formed on the apparatus main body 2. Accordingly, opening and closing of the original document reading device 3 is locked or unlocked.

In addition, as shown in FIGS. 8B and 10, a channel-shaped engagement concave portion 14B, which is open toward a rear side (a right side in FIGS. 10A and 10B) is formed at a right end face of the operation lever 14. The pin 19 provided on the arm 18 at a front end of the link rod 13 engages with and disengages from the engagement concave portion 14B as shown in FIGS. 9, 10A and 10B, so that a rotational operation of the operation lever 14 is locked and unlocked. As will be described later, the engagement and disengagement of the pin 19 with respect to the engagement concave portion 14B of the operation lever 14 is realized by an axial movement in front and rear directions of the link rod 13 accompanying opening and closing operations of the original document holder 4.

Next, a configuration of the second lock mechanism that locks opening and closing of the original document holder 4 with respect to the original document reading device 3 will be described.

Figure 12:
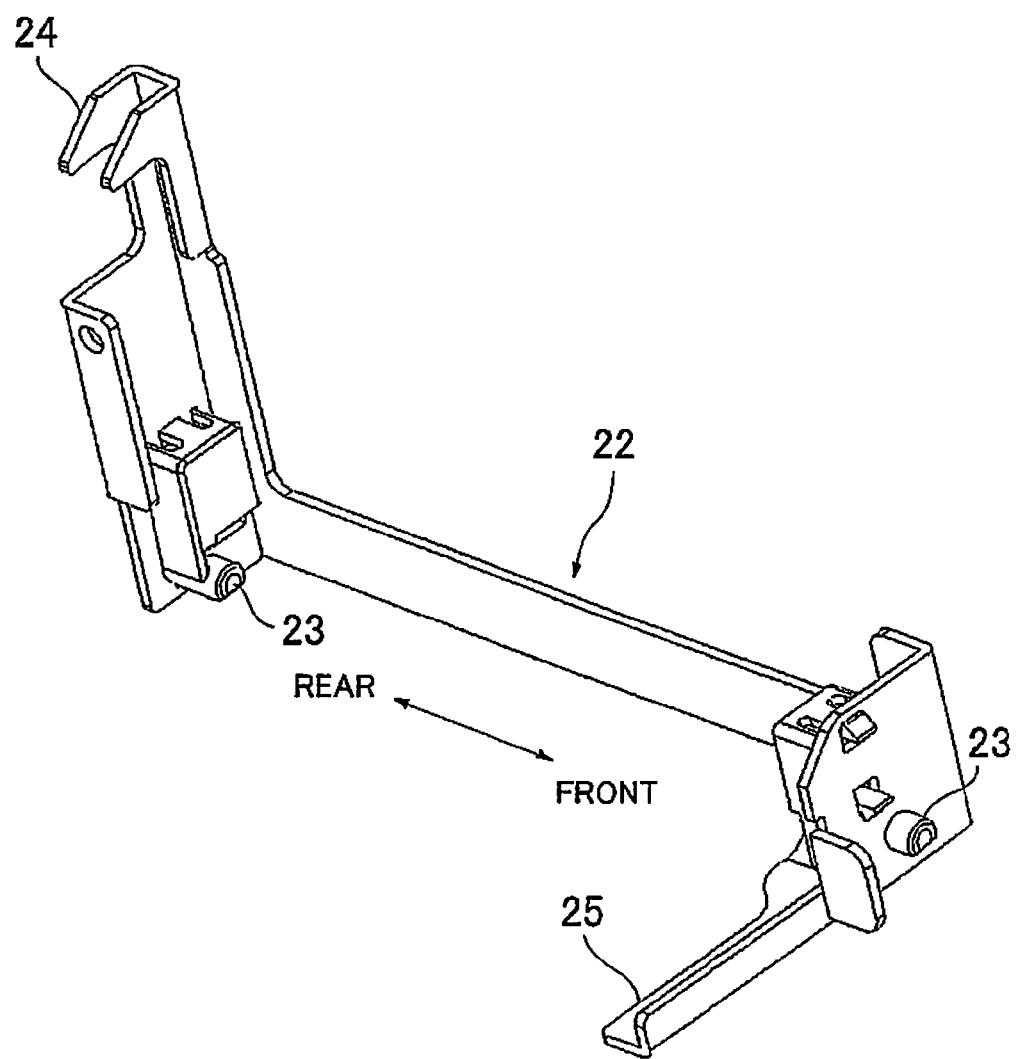
FIG. 12 is a perspective view of the second lock mechanism.

At a rear portion inside the cabinet 5 of the original document reading device 3, as shown in FIG. 5, a lock member 22 along the link rod 13 is disposed rotatable about a shaft 23 (see FIG. 12). A hook 24 is provided vertically at a right end of the lock member 22. In addition, a pressing arm 25 extending orthogonally to the lock member 22 toward a left side is provided in front of the lock member 22. A projection 2c provided on a right side of an upper face of the apparatus main body 2 (see FIGS. 2 and 13A) is configured to selectively abut the pressing arm 25.

As shown in FIGS. 4, 11, 13A and 13B, a rectangular plate-shaped original document holder lock member 26 is provided to project vertically downward from a rear end of a right side portion of the original document holder 4. In the original document holder lock member 26, a rectangular shaped engagement hole 26a is formed. In addition, at a lower portion of a rear end face of the original document holder lock member 26, an inclined engagement face 26b is formed.

Next, a relationship between opening and closing of the original document reading device 3 and the original document holder 4 and an operation of the first and second lock mechanisms will be described hereinafter.

Figure 11:
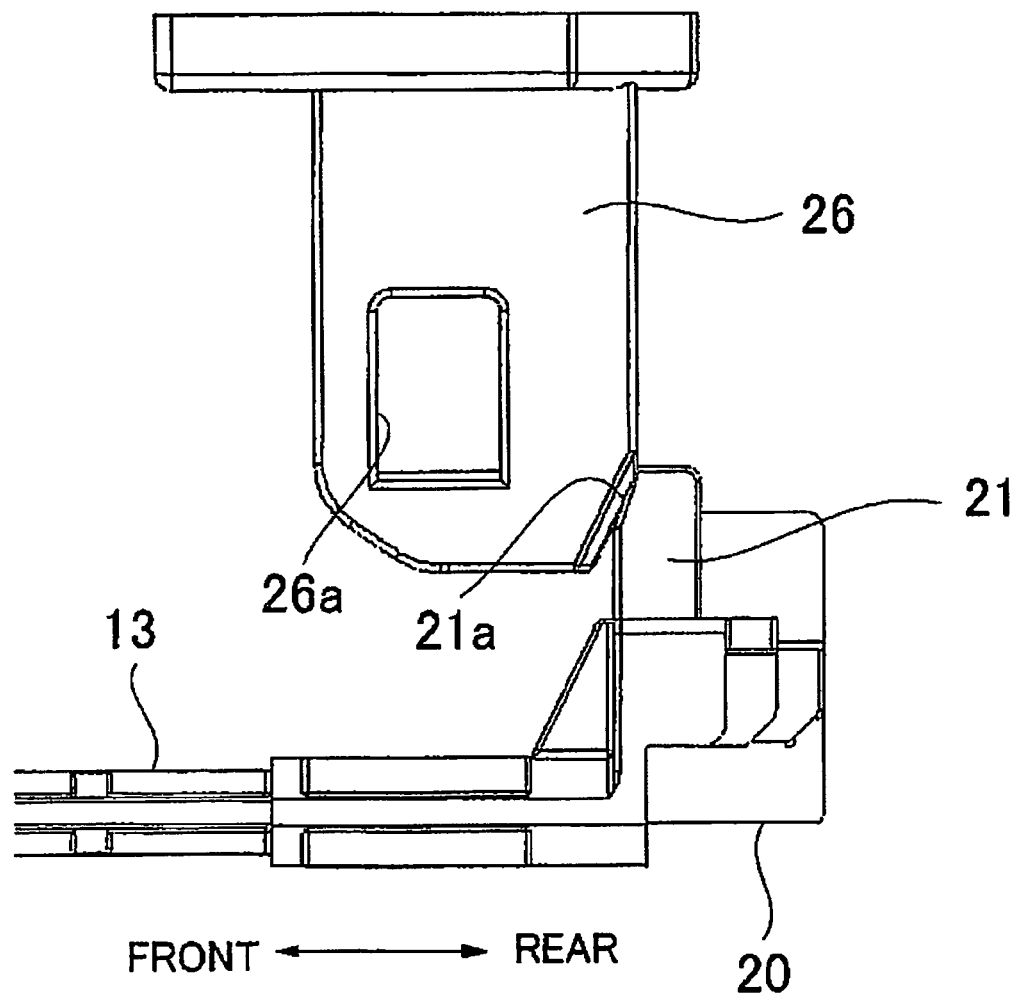
FIG. 11 is a diagram showing the engagement between the link rod and an original document holder lock member.
Figure 14A:
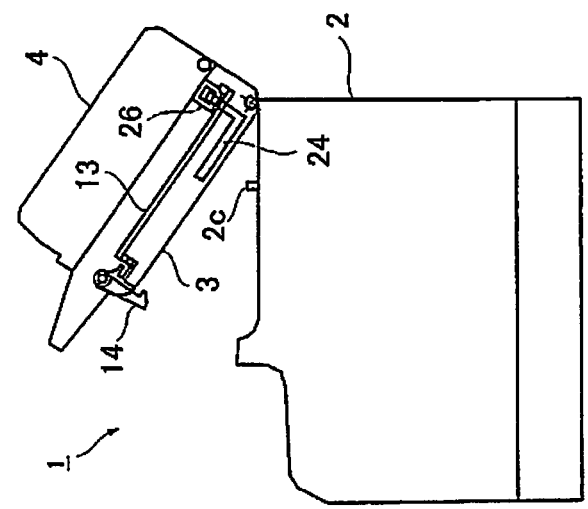
FIG. 14A is a diagram showing opening and closing of the original document reading device and the original document holder in the image forming apparatus.

As shown in FIGS. 1 and 14A, in a state in which the original document reading device 3 and the original document holder 4 are both closed and an image forming operation is possible, the engagement face 26b of the original document holder lock member 26 provided on the original document holder 4 engages with the cam surface 21a of the cam 21 installed upright at a rear end of the link rod 13 as shown in FIG. 11, thereby causing the link rod 13 to slide backward (in a direction shown by an arrow). It should be noted that the link rod 13 is biased forward by a spring (not illustrated).

In a state in which the original document holder lock member 26 causes the link rod 13 to slide backward against a biasing force exerted by the spring (not illustrated), the pin 19 provided on the arm 18 at the front end of the link rod 13 disengages from the engagement concave portion 14B of the operation lever 14. Accordingly, the rotation lock of the operation lever 14 is in a released state.

The operation lever 14 is biased by a spring (not illustrated) in a counterclockwise direction in FIGS. 10A and 10B about the shafts 14a and 14b. Therefore, in a state in which the operation lever 14 is not operated, the pair of left and right hooks 15 provided on the lever shaft 12 engages with the engagement parts 2b of the apparatus main body 2 as shown in FIG. 10A (FIG. 10A shows a state in which the original document holder 4 is opened and the rotation of the operation lever 14 is locked). Accordingly, in such a state, the first lock mechanism locks the rotation of the original document reading device 3, so that the original document reading device 3 is prevented from opening.

Figure 14B:
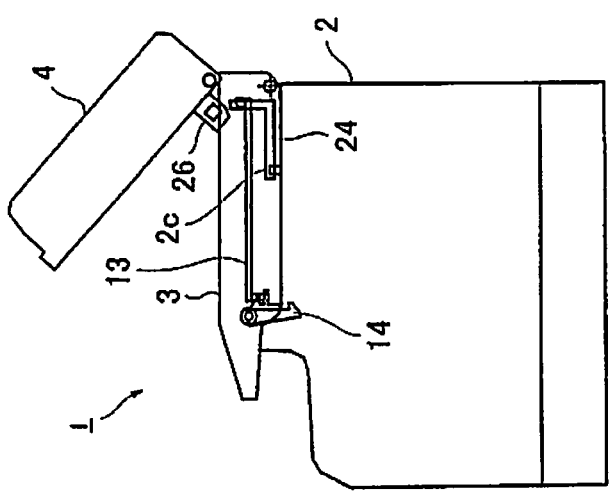
FIG. 14B is a diagram showing opening and closing of the original document reading device and the original document holder in the image forming apparatus.

In addition, in a state in which the original document reading device 3 and the original document holder 4 are both closed and an image forming operation is possible, as shown in FIG. 13A, the projection 2c provided at the upper face of the apparatus main body 2 abuts the pressing arm 25 of the lock member 22 composing the second lock mechanism and causes the entire lock member 22 to rotate about the shaft 23 in a direction shown by an arrow. As a result, the hook 24 of the lock member 22 disengages from the engagement hole 26a of the original document holder lock member 26, so that the rotation lock of the original document holder 4 performed by the second lock mechanism is released. Accordingly, when a user performs image formation, she or he can freely open the original document holder 4, as shown in FIG. 14B, and can place an original document on the platen glass 6 (see FIG. 3) of the original document reading device 3. The lock member 22 is biased about the shaft 23 by a spring (not illustrated) in a counterclockwise direction in FIGS. 13A and 13B (in a direction of engagement of the hook 24 with the engagement hole 26a of the original document holder lock member 26).

In addition, if the original document holder 4 is opened while the rotational movement of the original document reading device 3 is locked, the state shown in FIG. 11 (a state in which the original document holder lock member 26 abuts the cam 21 and causes the link rod 13 to slide backward) is released. And then, the link rod 13 slides forward due to the biasing force exerted by the spring (not illustrated). The pin 19 provided on the arm 18 of the link rod 13 engages with the engagement concave portion 14B of the operation lever 14, as shown in FIG. 10A. Accordingly, the rotational movement of the operation lever 14 is inhibited and the image reading device 3 is unopenable. As a result, it is possible to eliminate an occurrence of malfunction in which the original document reading device 3 is accidentally opened through an operation of the operation lever 14 for a case where the original document holder 4 is open.

Figure 14C:
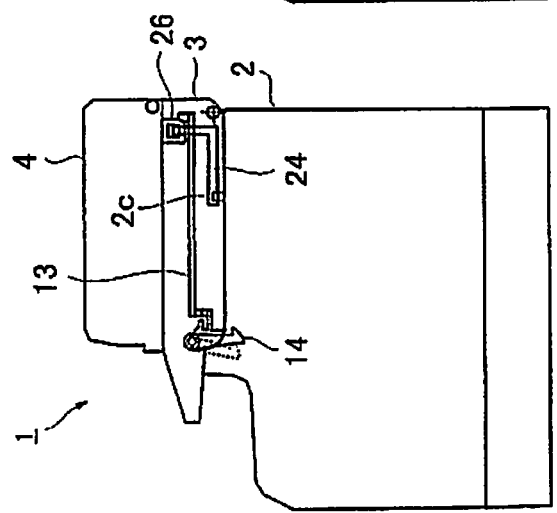
FIG. 14C is a diagram showing opening and closing of the original document reading device and the original document holder in the image forming apparatus.
Figure 15:
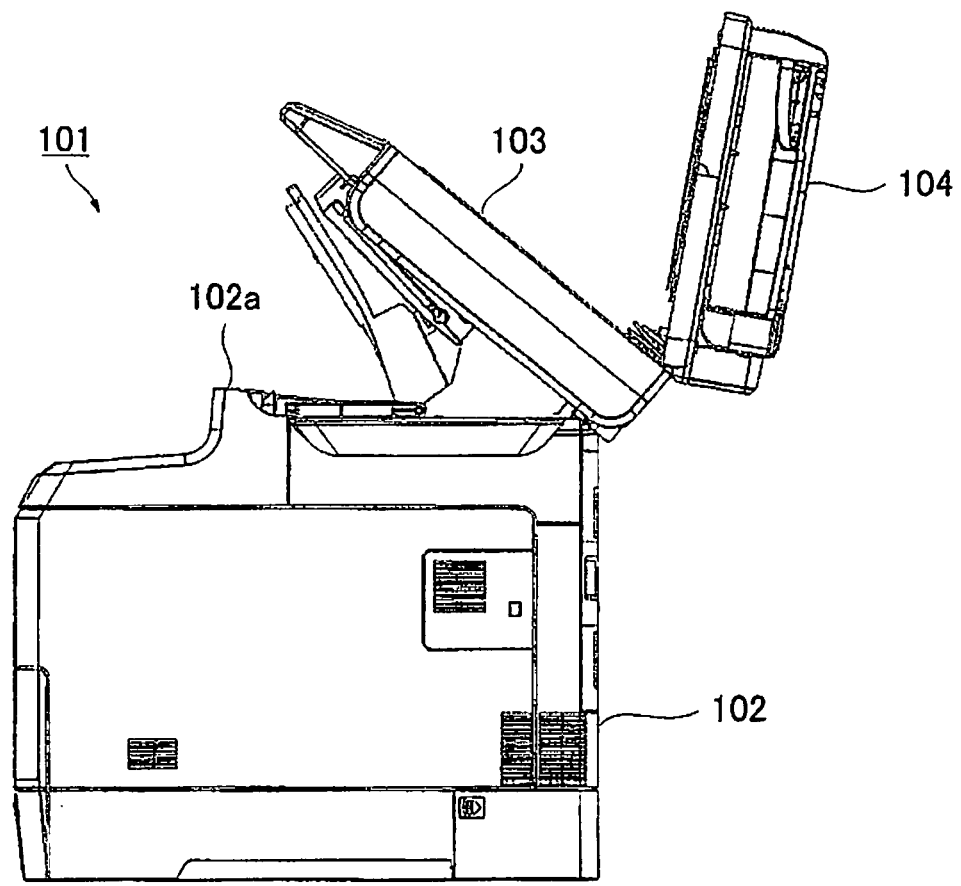
FIG. 15 is a side view showing a conventional image forming apparatus in which an original document reading device and an original document holder are opened.

As described above, in a state in which the original document reading device 3 and the original document holder 4 are both closed and an image forming operation performed by the image forming apparatus 1 is possible, the rotation lock performed by the operation lever 14 is released and the operation lever 14 can be freely and rotationally operated. Accordingly, if a user pulls and rotates the operation lever 14 for replacement of the drum unit, toner cartridge and the like, for example, the lever shaft 12 also rotates in the same direction. And then, the pair of left and right hooks 15 provided on the lever shaft 12 is rotated in the same direction, as shown in FIG. 10B, to disengage from the engagement parts 2b of the apparatus main body 2. As a result, as shown in FIGS. 2 and 14C, it is possible to open the original document reading device 3 along with the original document holder 4. As the original document reading device 3 and the original document holder 4 are opened in such a manner, the upper cover 11 also rotates as described above and the opening 2a of the apparatus main body 2 is exposed as shown in FIG. 2. Such a configuration allows a user to perform easy replacement along with improvement of working, by loading and unloading the drum unit and the toner cartridge for the apparatus main body through the exposed opening 2a.

In addition, as described above, when the original document reading device 3 is opened along with the original document holder 4, the pressing arm 25 of the lock member 22 composing the second lock mechanism clears the abutment from the projection 2c provided on the upper face of the apparatus main body 2. As a result, as shown in FIG. 13B, the lock member 22 rotates about the shaft 23 by the biasing force exerted by the spring (not illustrated) in a direction shown by an arrow, and the hook 24 engages with the engagement hole 26a of the original document holder lock member 26. Accordingly, rotation of the original document holder 4 with respect to the original document reading device 3 is locked, and it is impossible to open the original document holder 4 with respect to the original document reading device 3 when the original document reading device 3 is opened. As a result, as shown in FIGS. 2 and 14C, the original document holder 4 and the original document reading device 3 are always opened and closed integrally with respect to the apparatus main body 2.

As described above, the image forming apparatus 1 according to the present invention operates as follows when maintenance such as replacement of a drum unit and a toner cartridge is performed: When the opening and closing lock of the original document reading device 3 is released by the first lock mechanism and the original document reading device 3 is opened, the second lock mechanism locks opening and closing of the original document holder 4. Accordingly, the original document reading device 3 and the original document holder 4 are opened in unison. Accordingly, as shown in FIG. 14C, the original document holder 4 does not largely project from the apparatus main body 2, so that it is possible to reduce the shifting of a center of gravity of the image forming apparatus 1. As a result, it is possible to implement a stable installation of the image forming apparatus 1.

In addition, in the image forming apparatus according to the present invention, the first lock mechanism and the second lock mechanism are disposed inside the cabinet 5 of the image reading device 3. The second lock mechanism locks opening and closing of the original document reading device 3 with respect to the apparatus main body 2. On the other hand, the second lock mechanism locks opening and closing of the original document holder 4 with respect to the original document reading device 3. This can reduce the height of the original document reading device 3, thereby reducing the overall height of the image forming apparatus 1, leading to a simplified structure and a reduction in height and size. In addition, since an operator is not required to touch movable parts etc. of the first and second lock mechanisms, a cover for these movable parts becomes useless. Accordingly, an advantage that the number of components is reduced is obtained.

It should be noted that, although the above description has shown the embodiment of the present invention applied to a multi-function peripheral (MFP), it is possible to apply the present invention to other image forming apparatuses such as a copy machine, a printer, a facsimile machine and the like.

What is claimed is:

1. An image forming apparatus comprising:
an apparatus main body with an opening formed in an upper face thereof;
an original document reading device configured to open and close the opening;
an original document holder configured to be openably and closably supported by the original document reading device;
a first lock mechanism configured to lock opening and closing of the original document reading device with respect to the apparatus main body; and
a second lock mechanism configured to lock opening and closing of the original document holder with respect to the original document reading device; and
an upper cover configured to open and close the opening formed in the upper face of the apparatus main body,
wherein the first lock mechanism and the second lock mechanism are disposed inside a cabinet of the original document reading device, and
wherein the upper cover is configured to open and close the opening synchronously with opening and closing of the original document reading device.

2. An image forming apparatus, comprising:
an apparatus main body with an opening formed in an upper face thereof;
an original document reading device configured to open and close the opening;
an original document holder configured to be openably and closably supported by the original document reading device;
a first lock mechanism configured to lock opening and closing of the oriqinal document reading device with respect to the apparatus main body; and
a second lock mechanism configured to lock opening and closing of the original document holder with respect to the original document reading device,
wherein the first lock mechanism and the second lock mechanism are disposed inside a cabinet of the original document reading device,
wherein release of locking performed by the first lock mechanism is inhibited when the original document holder is opened with respect to the original document reading device under a condition in which the original document reading device is closed with respect to the apparatus main body, and
wherein release of locking performed by the second lock mechanism is inhibited when the original document reading device is opened with respect to the apparatus main body under a condition in which the original document holder is closed with respect to the original document reading device.

3. The image forming apparatus according to claim 2, wherein the first lock mechanism comprises:
a lever shaft configured to be rotated by an operation lever;
a hook configured to rotate along with the lever shaft and be engageable with an engagement part provided on the apparatus main body; and a first spring configured to bias the lever shaft and the hook in a direction to cause the hook to engage with the engagement part; and wherein the second lock mechanism comprises:

an original document holder lock member provided on the original document holder and comprising an engagement hole, and a lock member that has a hook engageable with the engagement hole, the image forming apparatus further comprising:

a link rod disposed orthogonal to the lever shaft and configured to be movable back and forth with respect to the operation lever;

a pin provided on a first end side of the link rod and configured to be engageable with an engagement concave part provided in the operation lever; and a mechanism comprising a second spring configured to bias the link rod toward the operation lever, wherein when the original document holder is closed, the original document holder lock member causes the link rod to slide toward a second end side thereof against a biasing force exerted by the second spring, thereby causing the pin provided on the first end side of the link rod to disengage from the engagement concave part of the operation lever, so that the opening and closing lock of the original document reading device performed by the first lock mechanism is releasable, and wherein when the original document holder is opened, the link rod slides to the first end side thereof due to the biasing force exerted by the second spring, thereby causing the pin to engage with the engagement concave part of the operation lever, so that the opening and closing lock of the original document reading device performed by the first lock mechanism is maintained.

4. The image forming apparatus according to claim 2, wherein the second lock mechanism comprises:

an original document holder lock member provided on the original document holder and comprising an engagement hole;

a lock member configured to be rotatable about a predetermined shaft and comprising a hook engageable with the engagement hole and a pressing arm abutable with a projection provided on the apparatus main body; and a spring configured to bias the lock member to rotate in a direction in which the hook engages with the engagement hole, wherein when the original document reading device is closed, the projection abuts the pressing arm to cause the lock member to rotate against a biasing force exerted by the spring of the second lock mechanism, thereby causing the hook to disengage from the engagement hole of the original document holder lock member, so that rotation lock of the original document holder performed by the second lock mechanism is released, and wherein when the original document reading device is opened, the projection departs away from the pressing arm to cause the lock member to rotate by the biasing force exerted by the spring, thereby causing the hook to engage with the engagement hole of the original document holder lock member, so that the opening and closing lock of the original document holder performed by the second lock mechanism is maintained.

* * * * *